(12) United States Patent
Barbagallo

(10) Patent No.: US 12,465,563 B2
(45) Date of Patent: Nov. 11, 2025

(54) BOTULINUM TOXIN FORMULATIONS AND METHODS FOR INTRANASAL DELIVERY THEREOF FOR THE TREATMENT OF ALLERGIC RHINITIS

(71) Applicant: Francesco Barbagallo, Hawthorn (AU)

(72) Inventor: Francesco Barbagallo, Hawthorn (AU)

( * ) Notice: Subject to any disclaimer, the term of this patent is extended or adjusted under 35 U.S.C. 154(b) by 370 days.

(21) Appl. No.: 17/757,116

(22) PCT Filed: Dec. 13, 2020

(86) PCT No.: PCT/AU2020/051364
§ 371 (c)(1),
(2) Date: Jun. 9, 2022

(87) PCT Pub. No.: WO2021/113926
PCT Pub. Date: Jun. 17, 2021

(65) Prior Publication Data
US 2023/0000761 A1    Jan. 5, 2023

(30) Foreign Application Priority Data
Dec. 13, 2019    (AU) ................................ 2019904728

(51) Int. Cl.
*A61K 9/00* (2006.01)
*A61K 31/137* (2006.01)
(Continued)

(52) U.S. Cl.
CPC .......... *A61K 9/0043* (2013.01); *A61K 31/137* (2013.01); *A61K 31/167* (2013.01);
(Continued)

(58) Field of Classification Search
CPC .. A61K 9/0043; A61K 31/137; A61K 31/167; A61K 38/4893; A61K 9/06;
(Continued)

(56) References Cited

U.S. PATENT DOCUMENTS 9,511,210 B2    12/2016    Deem et al.
9,867,972 B2    1/2018    Morriss et al.
(Continued)

OTHER PUBLICATIONS

Rohrbach, Saskia, Laskawi, Rainer, Minimally Invasive Application of Botulinum Toxin Type A in Nasal Hypersecretion 2001, ORL (Year: 2001).*

(Continued)

*Primary Examiner* — Philip R Wiest
*Assistant Examiner* — Brandon W. Levy
(74) *Attorney, Agent, or Firm* — INNOVATION CAPITAL LAW GROUP, LLP; Vic Lin

(57) ABSTRACT

A method for intranasal delivery of a formulation comprising Botulinum toxin for the treatment of allergic rhinitis involved impregnating an absorbent tip of an applicator with the formulation, the applicator having a rigid rod having the absorbent tip at a distal end thereof, and inserting the applicator straight into a nasal cavity of a patient beneath the lower turbinates to target the nasal- or nasopharynx-associated lymphoid tissue (NALT) and the eustachian tube opening zone of the nasopharynx within the nasal cavity with the absorbent tip.

17 Claims, 1 Drawing Sheet

(51) Int. Cl.
A61K 31/167 (2006.01)
A61K 38/48 (2006.01)
A61M 31/00 (2006.01)

(52) U.S. Cl.
CPC ......... *A61K 38/4893* (2013.01); *A61M 31/00* (2013.01); *C12Y 304/24069* (2013.01); *A61M 2202/049* (2013.01); *A61M 2210/0681* (2013.01)

(58) Field of Classification Search
CPC .............. A61K 9/08; A61K 2300/00; A61K 2039/543; A61M 31/00; A61M 2202/049; A61M 2210/0681; A61M 35/006; A61M 2210/0618; A61M 15/08; C12Y 304/24069; A61F 13/38; A61F 13/2005; A61P 37/08; A61P 11/00; A61P 11/02; A61P 29/00; A61P 25/00; A61B 1/233
See application file for complete search history.

(56) References Cited

U.S. PATENT DOCUMENTS

| | | | | |
|---|---|---|---|---|
| 2006/0067982 | A1* | 3/2006 | Haapakumpu | A61P 11/00 427/2.21 |
| 2007/0267011 | A1* | 11/2007 | Deem | A61N 1/05 128/200.23 |
| 2013/0085472 | A1* | 4/2013 | Shaari | A61M 25/10 604/257 |
| 2014/0120077 | A1* | 5/2014 | Ruegg | A61M 31/00 424/94.63 |
| 2014/0243793 | A1* | 8/2014 | Morriss | A61M 16/0438 604/514 |
| 2016/0250302 | A1 | 9/2016 | Ruegg et al. | |
| 2017/0128517 | A1* | 5/2017 | van der Vliet | A61K 38/03 |
| 2018/0221460 | A1 | 8/2018 | Sanders | |
| 2018/0271959 | A1 | 9/2018 | Hunt | |
| 2020/0276434 | A1* | 9/2020 | Goldfarb | A61N 1/0436 |
| 2021/0060233 | A1* | 3/2021 | Kim | A61M 3/0262 |

OTHER PUBLICATIONS

Anterior Nasal Packing, May 20, 2013, Entsho.com via Wayback Machine (Year: 2013).*
Jenna F. Gritzfeld, Paul Roberts, Lorna Roche, Sherouk El Batrawy, Stephen B Gordon, Comparison between nasopharyngeal swab and nasal wash, using culture and PCR, in the detection of potential respiratory pathogens, 2011, BMC Research Notes (Year: 2011).*
Cengiz Ozcan et al "Botulinum Toxin for Rhinitis" Current Allergy and Asthma Reports, vol. 16:58, pp. 1-7. 2016.
International Search Report & Written Opinion dated Feb. 18, 2021 from PCT Application No. PCT/AU2020/051364, 9 pages.
International-type dated Feb. 26, 2020 from PCT Application No. PCT/AU2020/051364, 14 pages.
Murat Salih Gunes et al "Evaluation of the effect of intranasal infiltrated botulinum toxin-A on a model of allergic rhinitis in rabbits: An Experimental Study". International Journal of Pediatric Otorhinolaryngology, vol. 83, p. 51-56. 2016.
Rohrbach, S. et al "Minimally Invasive Application of Botulinum Toxin Type A in Nasal Hypersecretion". ORL (Journal for Oto-Rhino-laryngology, Head and Neck Surgery), vol. 63, p. 382-384. 2001.

* cited by examiner

BOTULINUM TOXIN FORMULATIONS AND METHODS FOR INTRANASAL DELIVERY THEREOF FOR THE TREATMENT OF ALLERGIC RHINITIS

FIELD OF THE INVENTION

This invention relates generally to the treatment of Allergic Rhinitis (AR) and, more particularly, this invention relates to Botulinum toxin formulations and methods for intranasal delivery thereof for the treatment of allergic rhinitis.

BACKGROUND OF THE INVENTION

AR is an immunologic response modulated by immunoglobulin E (IgE) and characterized by sneezing, rhinorrhoea, nasal congestion, and pruritus of the nose.

AR is a major chronic respiratory disease by virtue of its high prevalence and significant effect on quality of life, work or school performance, and productivity. Data collected in Australian general practice suggest the national point prevalence of AR is 18.7%, with the highest prevalence among the 25-44-years age group (24.4%). Children also suffer with a prevalence rate of 12% in 6-7-year olds and 19.6% in 13-14-year-olds.

For people with AR, quality of life can be considerably reduced, leading to impaired performance of daily activities, cognitive function and classroom productivity, and reduced psychosocial wellbeing.

AR also creates a significant economic burden: the Australian Institute of Health and Welfare estimated that, in 1994, respiratory disease (including AR) accounted for 8.0% of total healthcare system costs.

A significant unmet need exists in the treatment of seasonal AR ('Hayfever') and perennial AR (persistent or intermittent AR).

Existing and established treatments include antihistamine tablets and nasal sprays, intranasal corticosteroid sprays, systemic immune-modifying drugs, and prolonged courses of multiple systematic desensitisation injections (immunotherapy).

These treatments however are imperfect and have many clinical issues associated with their use including generally variable efficacy from satisfactory to poor, drug or treatment side-effects causing poor tolerability and patient acceptance and other constraints in their utility such as high costs or poor compliance with complex and onerous desensitisation regimens.

More recently, Botulinum toxin has been proposed for blocking mucus production by mucus-producing cells in the nasal membrane. Botulinum toxin is capable of disabling adrenergic cells, including epithelial or goblet cells which are responsible for the majority of mucus production in the nasal cavity membrane.

Botulinum toxin Type A is the general name of the active medicine. Currently, there are three TGA-approved brands of this medicine in Australia each with an individual generic name to distinguish between them: Botox™ (Onabotulinumtoxin A) by Allergan™, Dysport™ (Abobotulinumtoxin A), by Ipsen/Galderma™, and Xeomin™ (Incobotulinumtoxin A), by Merz™.

However, currently trialled use of intranasal botulinum toxin medicine, has not been studied specifically for the treatment of AR, (only for intrinsic or non-allergic rhinitis) and furthermore, has administered the medication via intranasal injections (submucosal injection), which necessitates specialised ENT instrumentation and expertise.

For example, U.S. Pat. No. 9,867,972 B2 (Morriss et al) 16 Jan. 2018 discloses delivery devices for nasopharyngeal mucosa targets and U.S. Pat. No. 9,511,210 B2 (Deem et al) 6 Dec. 2016 discloses apparatus for toxin delivery to the nasal cavity both of which require specialised ENT instrumentation and expertise.

As such, a need exists for a method of administration that could be simply provided in a widespread manner by community-based General Practitioners in an ambulatory (out-patient) in-clinic technique.

Furthermore, reports in literature exploring the use of injected intranasal Botulinum toxin administer the medication at high doses that would generally be considered as cost-prohibitive due to the high price of biological drugs in general, including purified Botulinum toxin Type A medication. Such high costs would generally not be funded by the Healthcare System (e.g. Medicare Australia) for what is generally considered to be a trivial (i.e. a non-life threatening) condition and so treatments would be cost-prohibitive for routine general use.

As such, a need exists for Botulinum toxin formulations and treatment methods which decrease the cost thereof.

Furthermore, reports in the literature exploring the use of injected intranasal botulinum toxin did not report a significant duration of the treatment effect, sufficient to justify the inconvenience and high cost of an intrusive treatment procedure.

As such, a need exists for Botulinum toxin formulations and treatment methods which increase the duration of the treatment effect.

The present invention seeks to provide Botulinum toxin formulations and or methods for intranasal delivery thereof for the treatment of AR, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein Botulinum toxin formulations and methods for intranasal delivery thereof for the treatment of allergic rhinitis.

The present methods allow for simple administration that can be provided in a widespread manner by community-based General Practitioners. The present methods for intranasal delivery have been developed for an ambulatory (out-patient), in-clinic technique which thoroughly interrogate the intranasal airways with sterile cotton-tipped applicators approximately 150 mm in length to administer a specialised mixture of medications including Botulinum toxin Type A and carrier excipients onto the nasal mucosa including and particularly targeting the Nasal- or nasopharynx-Associated Lymphoid Tissue (NALT) and the Eustachian tube opening zone.

The internal intranasal spaces are divided by the midline nasal septum which separates the nasal cavity into a right and left side. The lateral nasal wall consists of inferior and middle turbinates (or conchae) and occasionally a superior or supreme turbinate bone. The opening of the maxillary sinuses is found under the middle turbinates on the lateral nasal wall. The retro-nasal space and nasopharynx are found deeply behind the nasal aperture.

The present method targets deep nasopharynx structures where the Nasal- or nasopharynx-Associated Lymphoid Tissues (NALT) are situated thereby acting on the immune system of nasal mucosa to effectively reduce the respiratory immune system nasal allergy response thereof.

Embodiments of the present methods for intranasal delivery also allow for a reduction of the dose of medicine used, to enable the treatment to be affordable by general patients.

According to one embodiment, a Botulinum toxin formulation is administered comprising a specialised mixture of medications and carrier excipients including Botulinum toxin Type A onto the nasal mucosa and the method employs systematic interrogation of the whole accessible nasal airway mucosa and 'massaging' of the formulation onto the mucosa, thereby allowing greater absorption and penetration of the medicines onto the mucosal target immune cells.

According to an embodiment, a Botulinum toxin formulation is employed which provides a greater duration of effect with a reduced dose of medicine used, to enable the treatment to be considered more cost-effective by general patients wherein an ideal dose of Botulinum toxin Type A is delivered with a penetration-enhancing mixture of medications and carrier excipients that facilitate greater uptake of the active medicine by the nasal mucosa, so allowing greater absorption and penetration of the medicines onto the mucosal target immune cells, with improved binding of the toxin molecule to the target cell receptors.

Furthermore, embodiments of the present methods of topical administration together with an ideal formulation of active medicines and carrier base excipients that provides topical penetration and good clinical effect wherein a technique of deep topical administration and dose formulation of active medicines is employed to provide good clinical effect which combined, enables the treatment to be provided easily (by trained GP doctors) and to be considered more accessible, affordable and acceptable by general patients.

According to one aspect, there is provided a method for intranasal delivery of a formulation comprising Botulinum toxin for the treatment of allergic rhinitis, the method comprising impregnating an absorbent tip of an applicator with the formulation, the applicator comprising a rigid rod having the absorbent tip at a distal end thereof, the method comprising inserting the applicator straight into a nasal cavity of a patient beneath the lower turbinates to target the nasal- or nasopharynx-associated lymphoid tissue (NALT) and the eustachian tube opening zone of the nasopharynx within the nasal cavity with the absorbent tip.

The absorbent tip may be cotton.

The rigid rod may be between 120 mm and 170 mm in length.

The rigid rod may be approximately 150 mm in length.

The absorbent tip may be massaged back-and-forth across the NALT and the eustachian tube opening zone.

Two applicators may be used and wherein each applicator may be inserted through a respective nostril.

The method may further comprise initially targeting the nasal cavity.

Targeting the nasal cavity may comprise targeting inside of the nasal vestibule.

Targeting the nasal cavity may comprise using the applicator to target septal walls and dorsal roof of the nasal spaces.

The method may comprise sweeping the rigid rod in a cranial direction.

Targeting the nasal cavity may comprise rotating the rigid rod.

The nasal cavity may be targeted for between 2 and 8 minutes.

The nasal cavity may be targeted for approximately five minutes.

The rigid rod may be inserted straight down along the sulcus below the inferior turbinate and/or the middle turbinates.

When inserting the rod along the sulcus, the rod may be rotated.

The NALT and the eustachian tube opening zone may be targeted for more than 10 minutes.

The NALT and the eustachian tube opening zone may be targeted for more than approximately 15 minutes.

The Botulinum toxin may be Type A Botulinum toxin.

The formulation may comprise poloxamer gel.

The formulation may comprise saline solution.

The formulation may comprise Lignocaine.

The formulation may comprise Adrenaline.

According to another aspect, there is provided A Botulinum toxin formulation for the treatment of allergic rhinitis, the formulation comprising Botulinum toxin and a poloxamer gel.

The Botulinum toxin may be Type A Botulinum toxin.

The formulation may comprise saline solution.

The formulation may comprise Lignocaine.

The formulation may comprise Adrenaline.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
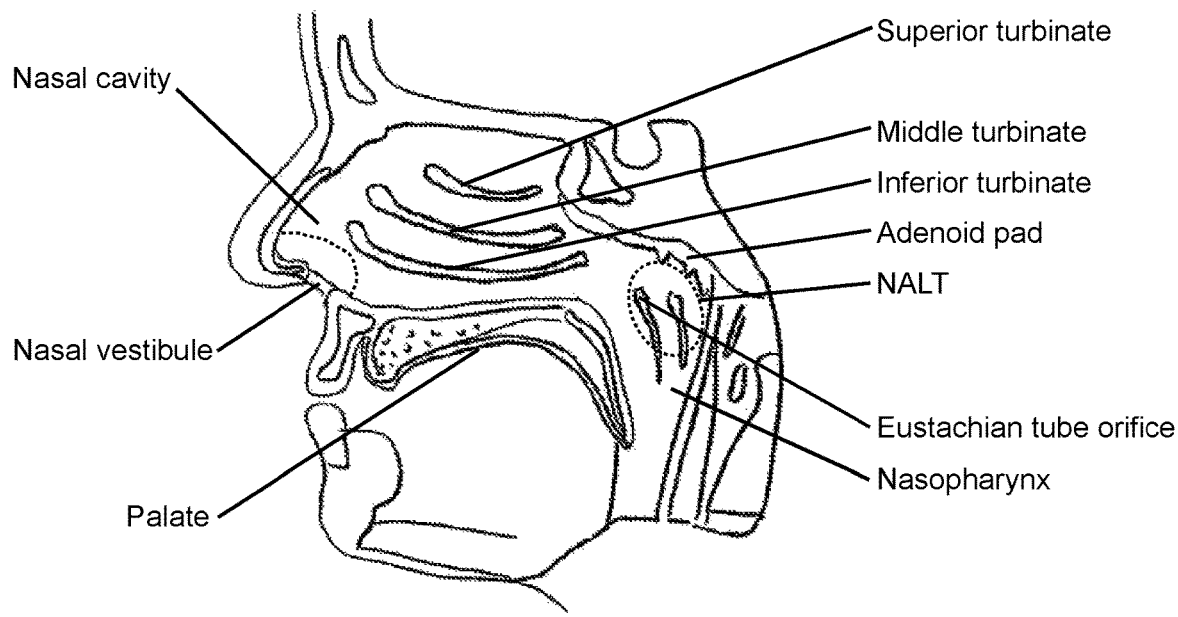
FIG. 1 shows a side view of the intranasal spaces.
Figure 2:
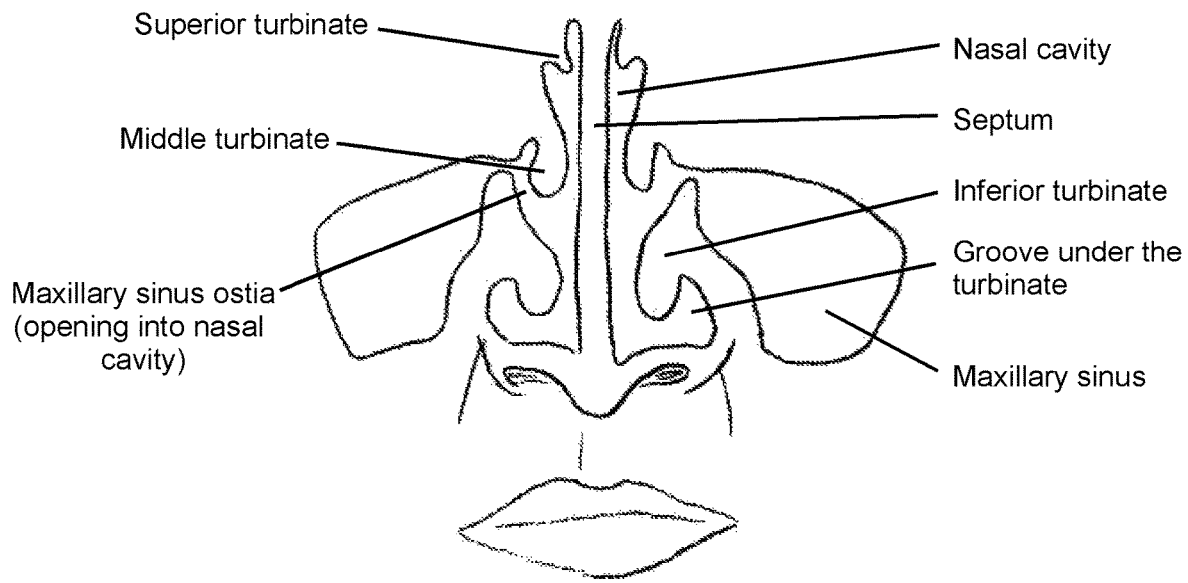
FIG. 2 shows a front view of the intranasal spaces.

Prior to performing the treatment, the physician should review their training materials on the functional anatomy of the mucosa and plan their approach to ensure that the physician is able to reach the NALT and Eustachian tube opening zone of the nasopharynx by accessing the groove or sulcus under the folds of the middle and inferior turbinates, as well as the maxillary ostial opening under the middle turbinate fold.

An assistant is optional if the physician wishes assistance to provide personal care and reassurance to the patient during the treatment.

The patient is preferably accommodated into a fully adjustable, motorised treatment chair or bed that may position patient into semi-recumbent (135 degrees), supine (180 degrees, flat) and Trendelenburg (200 degrees, tilted back with downslope) positions.

A pulse oximeter monitor may be applied to the patient's finger to provide reference to the patient's heart rate (HR) and oxygenation (SaO2) parameters during the treatment. Baseline measurements of HR, SaO2 and Blood Pressure are recorded and documented on the patient case record chart.

The patient is advised that they may experience all manner of symptoms akin to a typical hayfever 'attack' during the treatment, and they are reassured that they will be under direct clinical observation and will be taken care of by the physician.

The physician may ask the patient to blow their nose into a disposable paper tissue before proceeding further.

Before commencing, the physician may perform a visual inspection of the external nostrils and adjust any examination lighting to illuminate the nasal space to directly visualise the lower nasal septum and lower turbinates (conchae). The physician may note visible structural anomalies (such as deviated nasal septum), presence of inflammation (very likely), swelling (including presence of possible polyps) and mucous, and consider their impact on the conduct of the treatment protocol.

The present method may comprise initial preparation wherein the physician is to don a non-sterile disposable glove on their non-dominant hand (that will contact the patient's nose during treatment).

The physician may dispense the botulinum toxin formulation onto two sterile 150 mm cotton-tipped applicator buds, with half of the supplied volume being applied to each bud.

The physician may pass both applicators to the patient and ask the patient to initiate first contact of applicator bud into each nostril so that the patient can control the initial sensation and pressure of the bud inside the nostril. The patient may be instructed not to insert the applicators too deeply, other than getting used to the unusual intra-nasal sensation of a foreign body inside the nose.

Thereafter, the physician may take over control of the applicators in their dominant hand and use their non-dominant, gloved hand to control and adjust the patient's nose to support and control the movements of the applicator tips whilst they are inside the patient's nose.

The treatment method may comprise the physician using the dominant hand fingers to hold and manipulate the sterile applicators to perform a structured and comprehensive interrogation of each nasal cavity.

The physician then inserts one applicator into each nostril. Then, preferably using their dominant hand thumb and index/middle fingers, the physician may twirl/twist the applicator to allow each cotton tip to rotate and wipe against the adjacent nasal mucosa, whilst simultaneously advancing and withdrawing the applicator in a cranial-caudal axis to enter and exit the nasal airway spaces.

The physician may commence the interrogation by initially massaging the inside of the nasal vestibule, just inside the opening to the nostril. This allows easy stretching of the nasal alar as the cotton tip is rotated and wiped around the alar in sweeping circular movements to ensure both the alar aspect and septal aspects of the mucosa are contacted and massaged in this way.

Thereafter, the physician may commence deeper penetration with the cotton tips, rubbing each along the 'roof' of the nasal cavity (under the external dorsum) in the groove adjacent to the septum and the superior or middle turbinate. Such can be done by direct linear sweeps in a cranial direction and straight out again caudally, whilst rotating the applicators within the groove by rolling the applicator rod between their thumb and fingers.

Whilst gently massaging the whole septal aspect with the applicator cotton tips by wiping and rotating the cotton tips, the physician may determine the position and structure of the turbinates and trace them out by touch.

The physician may methodically use the applicator cotton tips to trace out, massage and rub into the mucosal lining; repeating the motions into the vestibule, septal walls, and dorsal roof of the nasal spaces. Increased sensitivity may be felt by the patient when applying pressure against a bony surface of the nasal bones versus pressure applied against cartilaginous or soft-tissue surfaces.

After about 5 minutes of this method, the physician may adjust the patient position into either a flat (supine) or slightly tilted back (Trendelenburg) position and advise the patient that the treatment will proceed to the deeper zone of the nasopharynx structures.

With the patient's head tilted back, the physician may apply slight pressure on their nasal tip in a cranial direction to expose direct access to a vertical plane in a line from their nostril straight down to their nasopharynx.

The physician may insert the applicators in a vertical orientation, and gently proceed straight down along the sulcus below the inferior turbinate and/or the middle turbinates to reach the nasopharynx.

The physician preferably carefully rotates the cotton tips whilst doing this to eventually gain access and bypass any swelling of the turbinate folds.

The physician then gently passes the applicator directly down until the back of the nasopharynx is reached, whilst preferably rotating the tips as several passes are performed up and down during which the physician may feel the resistance of the turbinate fold at the midpoint.

This manoeuvre is generally unpleasant for the patient during which the patient may experience a mild gagging sensation or pressure in the ears or teeth or associated pruritus (itching sensations) during this deep massage, so the physician may withdraw the applicators after several passes in response to these observations.

The physician may repeat all of the above steps several times. Preferably at least three complete interrogations of the whole nasal space, cavities and sulci (grooves) including the nasopharynx NALT region are performed.

During application, the physician may repeatedly stop and pause in response to patient feedback (direct observation or patient request) or sneezing fits and the like.

The physician may constantly observe the patient's face to be ready to cease the treatment if patient becomes distressed or suffers from sneezing fits. The physician may compress and pinch the patient nose (with the physician's gloved non-dominant hand) if a sneeze becomes apparent, either until the sneeze has occurred or the sensation has passed (advised by enquiry of the patient).

Either the physician or an assistant may make observations of the patient's lacrimal gland status (tearfulness) and nasal mucous production and be ready to use disposable paper tissues to dab away tears or mucous in order to keep the patient as comfortable as possible.

Preferably, the physician ensures at least 15 minutes of contact time during mucosal massaging, excluding any brief stoppage time. Rarely, extended stoppage time is required due to poor patient tolerance and the total treatment time is increased accordingly.

Both the innervation of the internal nasal space and secondary anxiety within the patient in coping with the treatment sensations, may provoke many physiological reactions in the patient and cause observable changes in their observable physiological state: result, the sympathetic nervous system stimulation may provoke sweating, pallor, tachycardia, fluctuations in blood pressure. Nasal cavity stimulation may provoke itchiness of the throat, eyes, ears; intense sneezing and/or coughing, possibly in fits or singularly; excessive lacrimation (tearfulness) or nasal mucous production (maybe either thick/viscous or thin/frothing) or nasal bleeding (blood nose or epistaxis [very rarely], or blood staining on applicator tips). Furthermore, specific ocular reactions include itchiness; bleariness, puffy-eye with conjunctival oedema; excessive lacrimation and tearfulness. All of these reactions resolve swiftly and spontaneously on completion of the treatment and cessation of the nasal stimulation.

Post application, the patient may be sat up in the treatment chair/bed, firstly to a semi-recumbent (135 degrees) and then into an upright (90 degrees) position to be recovered and allow the autonomic nervous system to stabilise after the deep stimulation.

Preferably, the patient is kept seated for 10 minutes and offered either cold water or herbal (peppermint or mint) teas to drink, to assist their recovery.

The patient may be asked to stand under direct observation of the physician or assistant, to ensure that the patient is stable on their feet in the standing position and there is no risk of a delayed vaso-vagal syncope.

There are no specific after-care instructions and the patient may return to their usual practices. The patient will have prominent nasal congestion present which mostly resorbs into the nasal linings shortly after the treatment. It is thought that these secretions are containing traces of the Botulinum toxin formulation so the patient is instructed to not blow their nose for at least 15 minutes following procedure completion. Usually, they may do so on leaving the clinic but are asked to delay if possible.

The present Botulinum toxin formulation may comprise Botulinum toxin Type A. Any of Abobotulinumtoxin A (DYSPORT™), Onabotulinumtoxin A (BOTOX™), or Incobotulinumtoxin A (XEOMIN™), may be used.

Poloxamer gel (also called Pluronic gel) may be used as a diluent to reconstitute the Botulinum toxin and penetration enhancer carrier base to facilitate mucosal adhesion and topical absorption of the toxin protein. Poloxamer gel is bio-adhesive to mucous membranes and helps the toxin protein to 'stick' to the nasal linings.

The formulation may further comprise a normal saline (Sodium chloride 0.9%) diluent to reconstitute the botulinum toxin.

The formulation may comprise Lignocaine as a local anaesthetic medication to provide numbing of the nasal mucosa and improve treatment comfort and tolerance by patient.

Furthermore, the formulation may comprise Adrenaline as a vasoconstrictor medication used to constrict the superficial blood vessels of the nasal mucosa and retard vascular flushing of the medication away from the mucosal surface.

The present procedure in formulations are only effective against true AR symptoms. Non-allergic rhinitis (or intrinsic rhinitis) is another common disorder that mimics AR with overlapping symptoms and may co-exist with AR as a secondary complication of uncontrolled AR. Thus, it is important for clinical assessment and correct diagnosis so that the treatment is only offered to suitable candidates. Any co-existing non-AR symptoms should be proportionally defined and advised, to ensure the correct expectations are set with the patient.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A method for intranasal delivery of a formulation comprising Botulinum toxin for the treatment of allergic rhinitis, the method comprising:
   impregnating an exterior of an absorbent tip of an applicator with the formulation prior to insertion of the applicator into a nasal cavity, the applicator comprising a rigid rod having the absorbent tip at a distal end thereof;
   initially targeting the nasal cavity by using the applicator to target inside a nasal vestibule, septal walls and a dorsal roof of the nasal cavity, wherein the initial targeting is performed from 2 minutes to 8 minutes;
   inserting the applicator straight into the nasal cavity of a patient beneath the lower turbinates to target the nasal- or nasopharynx-associated lymphoid tissue (NALT) and the eustachian tube opening zone of the nasopharynx within the nasal cavity with the absorbent tip; and
   massaging the absorbent tip back-and-forth across the NALT and the eustachian tube opening zone, wherein the NALT and the eustachian tube opening zone are targeted for more than 10 minutes.

2. The method as claimed in claim 1, wherein the absorbent tip is cotton.

3. The method as claimed in claim 1, wherein the rigid rod is between 120 mm and 170 mm in length.

4. The method as claimed in claim 3, wherein the rigid rod is approximately 150 mm in length.

5. The method as claimed in claim 1, wherein two applicators are used and wherein each applicator is inserted through a respective nostril.

6. The method as claimed in claim 1, wherein the method comprises sweeping the rigid rod in a cranial direction.

7. The method as claimed in claim 6, further comprising rotating the rigid rod.

8. The method as claimed in claim 1, wherein the initial targeting is performed for approximately five minutes.

9. The method as claimed in claim 1, wherein the rigid rod is inserted straight down along the sulcus below the inferior turbinate and/or the middle turbinates.

10. The method as claimed in claim 9, wherein, when inserting the rod along the sulcus, the rod is rotated.

11. The method as claimed in claim 1, wherein the NALT and the eustachian tube opening zone are targeted for more than approximately 15 minutes.

12. The method as claimed in claim 1, wherein the Botulinum toxin is Type A Botulinum toxin.

13. The method as claimed in claim 1, wherein the formulation comprises poloxamer gel.

14. The method as claimed in claim 1, wherein the formulation comprises saline solution.

15. The method as claimed in claim 1, wherein the formulation comprises Lignocaine.

16. The method as claimed in claim 1, wherein the formulation comprises Adrenaline.

17. The method as claimed in claim 1, further comprising:
after the initial targeting, adjusting the patient into a flat or tilted back position;
applying pressure on a nasal tip of the patient, in a cranial direction, to expose direct access to a vertical plane in a line from the nostril to the nasopharynx;
insert the applicator in a vertical orientation straight down along the sulcus of the patient, below the inferior turbinate and/or the middle turbinates; and
passing the application tip to reach a back side of the nasopharynx.

* * * * *